United States Patent [19]

Malm

[11] 4,246,654
[45] Jan. 20, 1981

[54] DIGITAL COHERENT PHASE DEMODULATOR

[75] Inventor: Robert Malm, Los Angeles, Calif.

[73] Assignee: Northrop Corporation, Los Angeles, Calif.

[21] Appl. No.: 2,061

[22] Filed: Jan. 9, 1979

[51] Int. Cl.³ .......................................... H04L 27/22
[52] U.S. Cl. ...................................... 375/82; 375/83; 364/484; 328/133
[58] Field of Search ................... 325/30, 320; 178/67, 178/88; 328/155; 329/122, 50; 375/53, 54, 80, 81, 82, 83, 90, 97, 86; 455/255, 258, 260; 331/1 A, 1 R, 25; 364/117, 480, 484, 701, 702; 340/170, 207 P; 370/19, 20, 12

[56] References Cited

U.S. PATENT DOCUMENTS 3,096,482  7/1963  Frank et al. ........................... 325/41
3,855,533  12/1974  Schüeli ................................. 370/20
4,087,752  5/1978  Melvin ................................. 325/320
4,138,644  2/1979  Godard et al. ....................... 325/320
4,178,631  12/1979  Nelson, Jr. ........................... 364/484

Primary Examiner—Benedict V. Safourek
Attorney, Agent, or Firm—Edward A. Sokolski

[57] ABSTRACT

A digital system for demodulating coherent phase shift keyed signals. Maximum likelihood estimates of the unmodulated phase and rate of change of the unmodulated phase of the received signal relative to a local oscillator signal are used to improve the demodulation process. The maximum likelihood estimates are obtained from measurements of the phase of the received signal relative to the local oscillator signal over a predetermined set of keying intervals. The digital demodulation process permits rapid "lock-on" at low signal-to-noise ratios.

4 Claims, 2 Drawing Figures

DIGITAL COHERENT PHASE DEMODULATOR

BACKGROUND OF THE INVENTION

1. Field of the Invention

The system of this invention pertains to systems for the demodulation of phase shift keyed signals. More particularly, the system pertains to the demodulation of coherent phase shift keyed signals. The system of this invention has particular merit when applied to communication systems utilizing a "burst" mode; that is, to systems which transmit data at high data rates for short periods of time followed either by periods of silence or by transmission of data on other frequencies.

Burst mode communication systems utilizing coherent phase shift keyed signals require demodulation systems that rapidly lock-on to the unmodulated phase of the transmitted signal so that only a modest portion of the transmission time is devoted to phase acquisition in order that most of the burst can be allocated to the transmission, reception and demodulation of data.

2. Description of the Prior Art

In the prior art, the local phase reference signal typically is aligned with the unmodulated phase of the received signal by means of a phase locked loop. The phase locked loop normally is implemented by analog means. Compared to the system of this invention the phase-locked loop is a relatively inefficient means for adjusting or correcting the phase of the local reference signal to agree with that of the received signal.

SUMMARY OF THE INVENTION

The system of this invention utilizes digital computational techniques to compute a maximum likelihood estimate of the unmodulated phase and the rate of change of the unmodulated phase of the received signal with respect to a local oscillator signal so that, in effect, the local oscillator signal can be compensated or corrected in phase so as to agree with the unmodulated phase of the received signal. The maximum likelihood estimates are based on measurements of the phase of the received signal over a preselected set of keying intervals. Because the system of this invention utilizes maximum likelihood estimates, it generates a more accurate approximation to the unmodulated phase of the received signal in less time than that required by the analog systems of the prior art.

The system of this invention operates as follows: At the beginning of a communication burst, the phase of the received signal relative to the local oscillator signal is measured for a preselected first set of keying intervals. A first maximum estimate of the unmodulated phase and the rate of change of the unmodulated phase of the received signal is calculated based on these measurements of the phase of the received signal during this first set of keying intervals. The first estimate for the unmodulated phase and the rate of change of the unmodulated phase of the received signal relative to the local oscillator signal are then used by means of extrapolation to generate a first phase reference for the successive, second preselected set of keying intervals. The phase of the signal received during the second set of keying intervals then is compared to the first phase reference for the second set of keying intervals to obtain a second estimate of the unmodulated phase and the rate of change of the unmodulated phase of the received signal relative to the local oscillator signal during the second set of keying intervals. The second estimate is used to generate a second, improved, phase reference for the second set of keying intervals, and also is used to generate, by means of extrapolation, a first phase reference for the third successive set of keying intervals. The sequence of obtaining a first phase reference, a second estimate, and a second phase reference is repeated for each successive set of keying intervals. The second phase reference obtained for each set of keying intervals is used to demodulate the signal for the same set of keying intervals.

At the beginning of the communication burst, during the first one or two sets of keying intervals, the received signal normally is unmodulated so that the unmodulated phase of the received signal can be determined more quickly and accurately. After the initial sets of keying intervals, when the received signal is phase modulated, a phase comparison system which is insensitive to changes in phase of $\pi$ radians is used to measure the phase of the received signal relative to its predicted unmodulated phase. In this way, the system continues to update its estimates of the unmodulated phase and unmodulated rate of change of phase of the received signal relative to the local reference.

BRIEF DESCRIPTION OF THE DRAWINGS

FIG. 2A lists the values of variables to be loaded into the microprocessor.

DESCRIPTION OF THE PREFERRED EMBODIMENT

Figure 1:
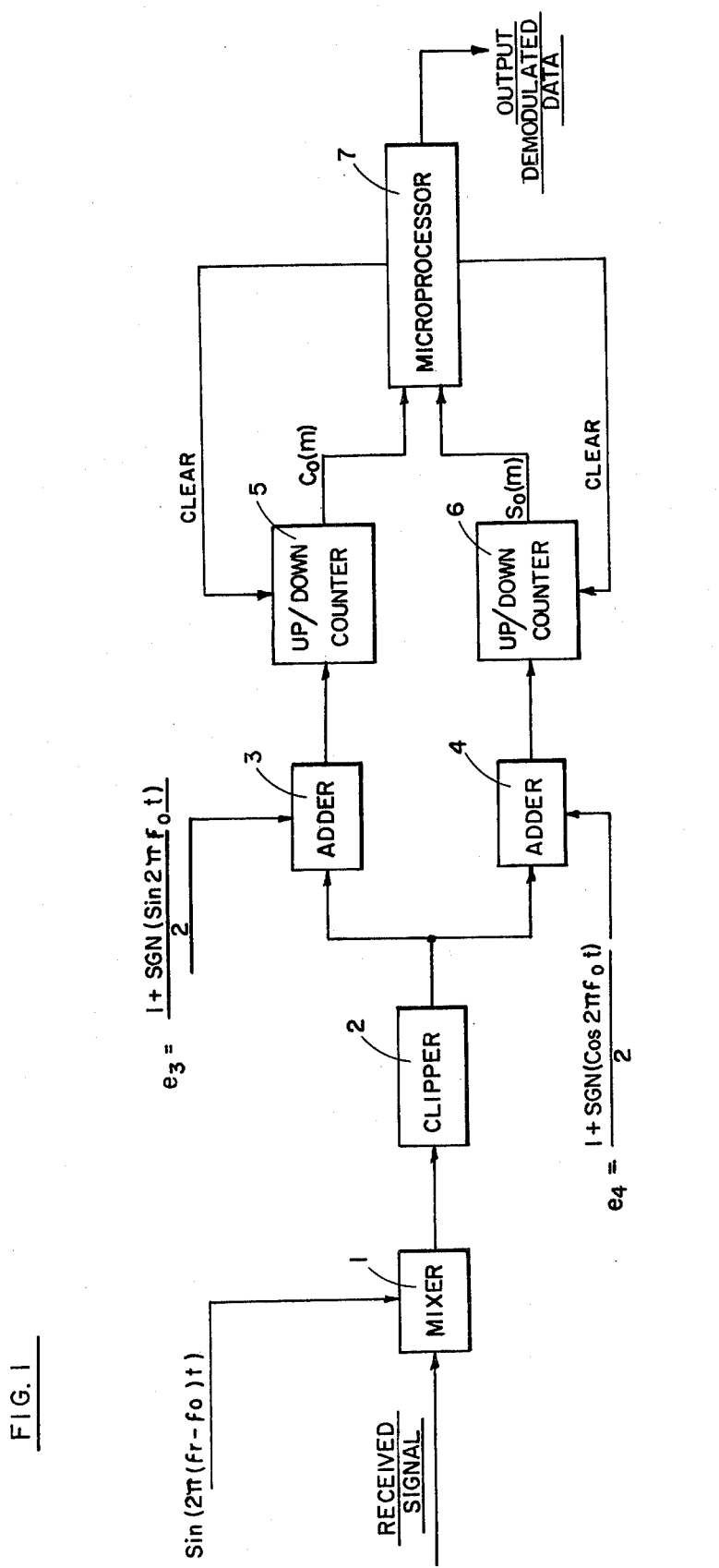
FIG. 1 is a block diagram of the invention.

Referring to FIG. 1, the received signal enters mixer 1 where it is mixed with a local mixer signal which is offset from the received signal by the intermediate frequency, $f_0$, in order to shift the received signal to the intermediate frequency $F_0$. The received signal, at the intermediate frequency, then enters clipper 2 which acts as a limiter and generates a square wave output at the intermediate frequency consisting of binary 0's and 1's. The output of clipper 2 is divided in two parts and applied to adders 3 and 4. A square wave consisting of binary 0's and 1's, as given by the equation:

$$e_3 = \frac{1 + SGN(\sin 2\pi f_0 T)}{2} \tag{1A}$$

is also applied to adder 3, i.e., the local oscillator signal at the IF frequency is also applied to adder 3. Adder 3 is a modulo 2 adder and gives an output of "0" when inputs are both "0" or both "1", and gives an output of "1" when one input is "0" and the other is a "1". A square wave shifted 90° with respect to the local oscillator signal at the IF frequency, that is, a signal given by $$e_4 = \frac{1 + SGN(\cos 2\pi f_0 T)}{2} \tag{1B}$$

is input to adder 4 which is also a modulo 2 adder.

The received signal, of course, could be compared directly with a local oscillator signal operating at the frequency of the received signal. However, if the system is to operate on a number of different frequencies, its design is simplified if the received signal is first converted to an intermediate frequency and then compared to a local oscillator operating at the intermediate frequency. In such a conversion system, the received signal, in effect, is compared to the combined phases of the local oscillator at the intermediate frequency and the local signal which is offset by the intermediate frequency that is supplied to the mixer to translate the received signal to the intermediate frequency. For simplicity of description, the received signal is described here as being compared in phase with the local oscillator signal although such comparison may, in fact, be to the combined phases of the two local oscillators in a conversion type receiver.

The outputs of adders 3 and 4 control the up-down counters 5 and 6, respectively. The counters count up for a "0" input and count down for inputs of "1". The output, $C_0(m)$, of counter 5 and the output, $S_0(m)$, of counter 6 are input to microprocessor 7. At the end of each keying interval, the microprocessor reads the outputs of counters 5 and 6 for that keying interval and then resets the counters 5 and 6 for the beginning of the next keying interval.

The microprocessor operates on $C_0(m)$ and $S_0(m)$ to obtain estimates and predictions for the unmodulated phase and the rate of change of the unmodulated phase of the received signal relative to the local oscillator signal during each set of keying intervals and to generate first and second phase references. The best mode utilizes 32 successive keying intervals for each set; however, the selection of this particular number is not critical to the operation of the invention. In addition to calculating first and second estimates for the unmodulated phase and the rate of change of the unmodulated phase of the received signal relative to the local oscillator signal for successive sets of keying intervals and generating first and second pulse references, the microprocessor also compares the 2nd phase estimates of the unmodulated phase, which has been calculated in the microprocessor for each set of keying intervals, with the actual phase of the received signal and by this means demodulates the received signal so as to obtain and output the modulation data.

Figure 2:
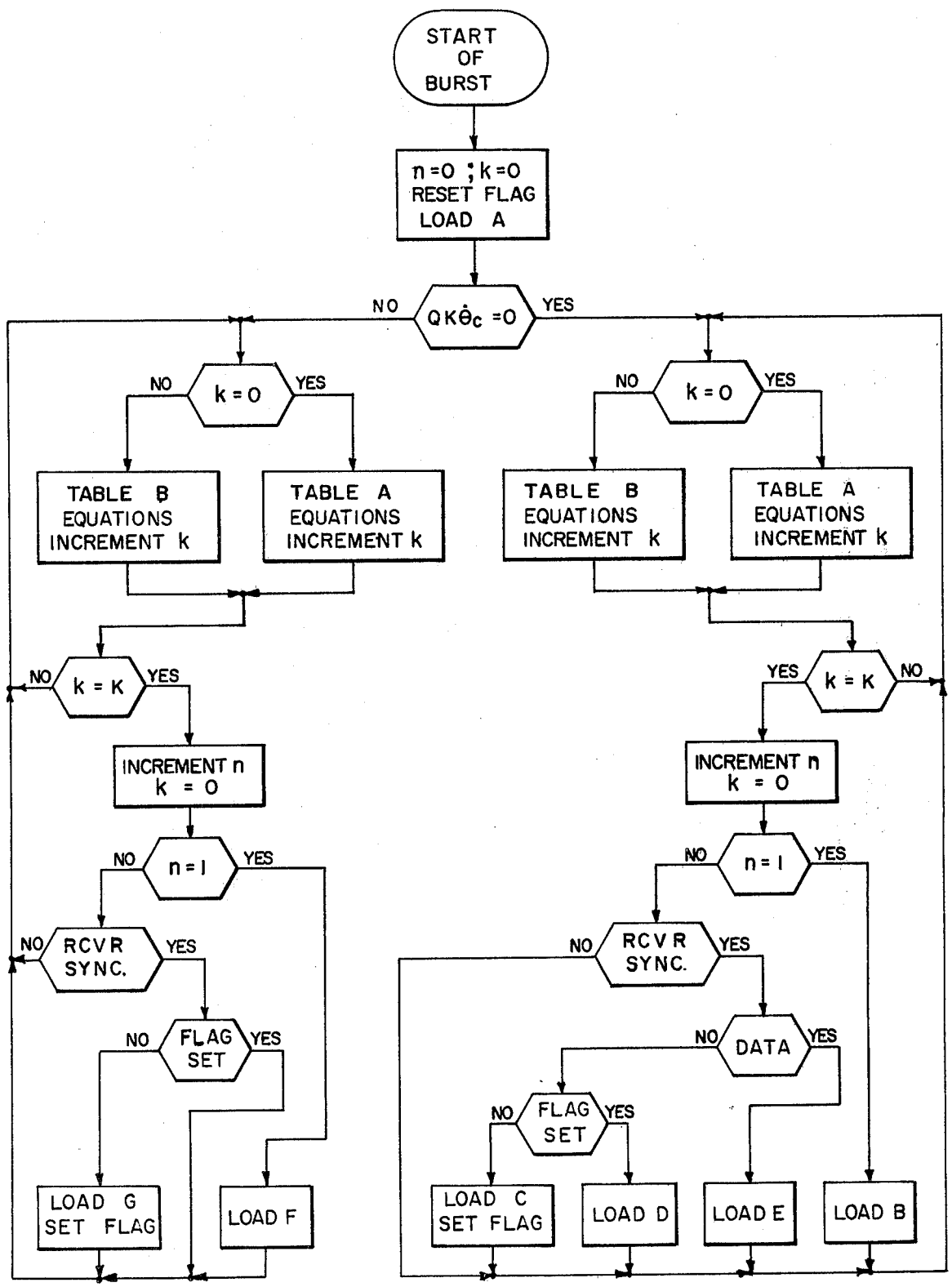
FIG. 2 is a flow diagram which illustrates the operation of the microprocessor contained in this invention.

To calculate the first and second estimates for the unmodulated phase and the rate of change of the unmodulated phase, which are used to generate the first and second phase references, and to demodulate the received signal, the microprocessor executes the series of equations set forth in Tables A and B in the sequence indicated in the tables and by the flow diagram appearing in FIG. 2. The following outline of the derivation of the equations or algorithms executed by the microprocessor 7 is included as the most appropriate means for describing and explaining the operation of the microprocessor.

For purpose of the derivation of the algorithms, the binary phase-shift-keyed signal, s(t), which is received by the system is defined by the equation $$s(t) = A(t) \sin [2\pi ft + M(m) \cdot \pi + \phi_c(t)] \tag{2A}$$

where $A(t)$ and $\phi_c(t)$ are slowly varying amplitude and phase functions representing the effects of varying propagation properties and doppler shift, and $M(m)$ is the data bit for the m'th keying interval and is either 0 or 1 for each value of m. The phase of the signal, $\theta_m(m)$, relative to the local reference signal, sin $(2\pi ft)$ during the m'th keying interval is given approximately by the expression $$\theta(m) = M(m) \cdot \pi + \phi(t = mT) \tag{2B}$$

where T is the duration of the keying interval and the change in $\theta$ during the keying interval is assumed to be negligible. The phase $\theta(m)$ is measured as shown in FIG. 1. The received signal enters mixer 1 where it is mixed with a local mixer signal which has been offset by the intermediate frequency, $f_0$, and thus is translated to some convenient intermediate frequency, $f_0$. The translated signal then enters clipper 2 where it is clipped to form a square wave whose value is zero when the input to the clipper is negative and 1 when the input to the clipper is positive. The clipped signal is logically added (modulo 2) to local oscillator sine and cosine square waves at the intermediate frequency, $f_0$, in first adder 3 and second adder 4. "Zeros" output by the modulo 2 adders 3 and 4 cause the up/down counters 5 and 6 to count up. "Ones" cause the up/down counters 5 and 6 to count down. The counters count a clock signal which is at a much higher frequency than $f_0$. The contents of the counters are read by the microprocessor 7 at the end of each keying interval and the up/down counters 5 and 6 are then cleared in preparation for counting during the next keying interval. All angles in this specification are expressed in units of $\pi/2ZT$ radians, where Z is the clock frequency.

The counter outputs, $C_0(m)$ and $S_0(m)$, from counters 5 and 6 for the m'th keying interval are used by the microprocessor 7 to calculate the phase angle $\theta_m(m)$ of the received signal in accord with the following equation $$\theta(m) = [SGN\ S_0(m)] \cdot [ZT = C_0(m)] \tag{3}$$

where Z is the counter clock frequency.

The frequency of the received signal at the I.F. frequency normally will differ slightly from the reference oscillator at the I.F. frequency because of Doppler shift or because the transmitter and combined received oscillator frequencies are not exactly the same. For most practical situations, the offset in frequency, whatever its origin, will not change significantly over many keying intervals. One can therefore approximate the unmodulated phase of the received signal relative to the local oscillator signal by a linear function of time over a group of K keying intervals (assuming for simplicity of explanation that "zeros" are being transmitted, i.e., $M(m) = 0$) as follows:

$$H(nK + k) = \bar{\theta}_c[(n - 1)K] + \frac{K + 1}{2} \dot{\theta}_c[(n - 1)K] + k\dot{\theta}_c[(n - 1)K] \tag{4}$$

where $m = nK + k$, k takes on integer values between 0 and $K - 1$ and n takes on integer values. $H(nK + k)$ is referred to here as the extrapolated phase reference for the n'th group of K keying intervals. It is based on estimates of the mean phase $\bar{\theta}_c$ and the time rate of change of phase $\dot{\theta}_c$ for the previous group of keying intervals relative to the local oscillator signal.

The phase reference obtained from measurements on the previous group which describes the phase during the previous group period is defined as:

$$\theta_r(nK + k) = \bar{\theta}_c[(n - 1)K] = \frac{K-1}{2} \dot{\theta}_c[(n - 1)K] + k\dot{\theta}_c[(n - 1)K]. \tag{5}$$

Note that $\theta_r(nK+k)$ actually represents the estimate of the phase of the signal during the $[(n-1)K+k]$ keying interval, but the index, $(nK+k)$, is used here to simplify the mathematical description of the algorithms executed by the microprocessor. This phase reference $\theta_r(nK+k)$ is used to perform the demodulation function.

The maximum likelihood estimates $\bar{\theta}_c(nK)$ and $\dot{\theta}_c(nK)$ are given by the equations $$\bar{\theta}_c(nK) = \frac{1}{K} \sum_{k=0}^{K-1} \theta_c(nK + k) \tag{6}$$

$$\dot{\theta}_c(nK) = \frac{\sum_{k=0}^{K-1}(2k - K + 1)\theta_c(nK + k)}{K(K - 1)(K + 1)/6} \tag{7}$$

where $\theta_c$ is the unmodulated phase of the received signal with respect to the local oscillator signal during the $(nK+k)$th keying interval.

The mathematical basis for such maximum likelihood estimates is described on page 549 of "Mathematical Methods of Statistics", by Cramer, Princeton University Press, Princeton, N.J. (1961).

These equations assume that $\theta_c$ is a normally-distributed random variable with a mean which is a linear function of time. It should be noted that $\theta_c(m)$ can increase or decrease without limit while the $\theta(m)$ defined by equation (3) is constrained to the range $-2ZT$ to $+2ZT$. It follows that $$\theta(m) = [\theta_c(m)]_{\pm 2ZT} \tag{8}$$

where the brackets and subscript denote a translation of the angle to a $-2ZT$ to $+2ZT$ range.

If reasonably good estimates of $\bar{\theta}_c$ and $\dot{\theta}_c$ are available, then $\theta_c(m)$ will usually be within one half cycle of $H(m)$ and thus $$\theta_c(m) - H(m) = [\theta_c(m) - H(m)]_{\pm 2ZT} \tag{9}$$

Since $$\theta_c(m) = [\theta_c(m)]_{\pm 2ZT} \pm p2\pi \tag{10}$$

where p is an integer, one can rewrite equation (10) as $$\theta_c(m) - H(m) = \{[\theta_c(m)]_{\pm 2ZT} - H(m) \pm p2\pi\}_{\pm 2ZT} \tag{11}$$

or equivalently as $$\theta_c(m) - H(m) = \{[\theta_c(m)]_{\pm 2ZT} - H(m)\}_{\pm 2ZT} \tag{12}$$

Substitution of equation (8), obtains $$\theta_c(m) - H(m) = \delta\theta(m) \tag{13}$$

where $$\delta\theta(m) \triangleq [\theta(m) - H(m)]_{\pm 2ZT} \tag{14}$$

Combining equations (4), (6), and (13), one obtains $$H(nK+k) = H(nK) + k\dot{\theta}_c[(n-1)K] \tag{15}$$

where $$H(nK) = \frac{1}{K}\sum_{k=0}^{K-1} H[(n-1)K+k] + \frac{1}{K}\sum_{k=0}^{K-1} \delta\theta[(n-1)K+k] + \frac{K+1}{2}\dot{\theta}_c[(n-1)K] \tag{16}$$

Combining equations (5), (6), and (13), one obtains $$\theta_r(nK+k) = \theta_r(nK) + k\dot{\theta}_c[(n-1)K] \tag{17}$$

where $$\theta_r(nK) = H(nK) - K\dot{\theta}_c[(n-1)K] \tag{18}$$

Since $$H[(n-1)K+k] = H[(n-1)K] + k\dot{\theta}_c[(n-2)K] \tag{19}$$

and $$\frac{1}{K}\sum_{k=0}^{K-1} H[(n-1)K + k] = \tag{20}$$
$$H[(n-1)K] + \frac{K-1}{2}\dot{\theta}_c[(n-2)K]$$

equation (16) can be rewritten as $$H(nK) = \tag{21}$$
$$H[(n-1)K] + \frac{1}{K}\sum_{k=0}^{K-1}\delta\theta[(n-1)K + k] + K\dot{\theta}_c[(n-1)K]$$

where it has been assumed that $$\dot{\theta}_c[(n-2)K] \approx \dot{\theta}_c[(n-1)K] \tag{22}$$

Combining equations (18) and (21), obtains $$\theta_r(nK) = H[(n-1)K] + \frac{1}{K}\sum_{k=0}^{K-1}\delta\theta[(n-1)K + k] \tag{23}$$

If the received signal is carrying data, then $\delta\theta$ will be ambigious in phase by $2ZT(=180°)$. Since noise-produced fluctuations in $\delta\theta$ will usually be less than $ZT$, one can remove the data contamination from $\delta\theta$ by either adding or subtracting an integral number of $2ZT$'s from $\delta\theta$ so that $\delta\theta$ falls in the range $-ZT$ to $+ZT$. In accordance with the previous notation one represents this operation by brackets and the subscript $=ZT$.

Equations (21) and (23) now become $$H(nK) = H[(n-1)K] + K\dot{\theta}_c[(n-1)K] + \begin{cases} \frac{1}{K}\sum_{k=0}^{K-1}\delta\theta[(n-1)K + k] \text{ ; data absent} \\ \frac{1}{K}\sum_{k=0}^{K-1}\{\delta\theta[(n-1)K + k]\}_{\pm ZT} \text{; data present} \end{cases} \tag{24}$$

$$\theta_r(nK) = H[(n-1)K] + \begin{cases} \frac{1}{K} \sum_{k=0}^{K-1} \delta\theta[(n-1)K + k]; \text{ data absent} \\ \frac{1}{K} \sum_{k=0}^{K-1} \{\delta\theta[(n-1)K + k]\}; \text{ data present} \\ \pm ZT \end{cases} \quad (25)$$

However, it is important not to do the ZT transformation on $\delta\theta$ unless data is present since the operation degrades performance somewhat.

The use of equation (7) for the calculation of $\dot{\theta}_c$ presents some problems for the first group of keying intervals if reasonably good initial estimates of $\bar{\theta}_c$ and $\dot{\theta}_c$ are not available. Under these circumstances $\theta_c$ cannot be related to the measured phase $\theta$ by means of equations (13) and (14). In order to avoid this problem, one writes equation (7) in terms of $\theta_c$ differences.

$$\dot{\theta}_c(nK) = \frac{\sum_{k=1}^{K-1} k(K-k)[\theta_c(nK+k) - \theta_c(nK+k-1)]}{K(K-1)(K+1)/6} \quad (26)$$

Substituting equation (13) for $\theta_c$, obtains $$\dot{\theta}_c(nK) = \frac{\sum_{k=1}^{K-1} k(K-k)[H(nK+k) - H(nK+k-1)]}{K(K-1)(K+1)/6} + \frac{\sum_{k=1}^{K-1} k(K-k)D\theta(nK+k)}{K(K-1)(K+1)/6} \quad (27)$$

where $$D\theta(nK+k) \triangleq \begin{cases} \delta\theta(nK+k) - \delta\theta(nK+k-1); \text{ data absent} \\ \text{(to be specified later)} \quad ; \text{ data present} \end{cases} \quad (28)$$

It should be noted that $D\theta$, as defined above, may experience changes in phase of 2ZT ($=180°$) from one keying interval to the next when data is being transmitted. These phase changes must be removed if valid estimates of $\dot{\theta}_c$ are to be made during data transmission. The procedure for removing these phase changes will be described later.

Substitution of equation (4) for H, obtains $$\dot{\theta}_c(nK) = \dot{\theta}_c[(n-1)K] + \frac{\sum_{k=1}^{K-1} k(K-k)D\theta(nK+k)}{K(K-1)(K+1)/6} \quad (29)$$

Rather than implement the above equation in the microprocessor to calculate a maximum likelihood estimate for $\dot{\theta}_c$, it is easier to implement the following equation which is an approximation to the above equation.

$$\dot{\theta}_c(nK) = \dot{\theta}_c[(n-1)K] + \frac{1}{A} \sum_{k=K/2}^{K-1} r \frac{1 - r^{K-k}}{1 - r} X(nk+k) \quad (30)$$

where $$X(nK+k) = \begin{cases} D\theta(nK+k) & ; k = K/2 \\ D\theta(nK+k) + D\theta(nK+K-k) & ; k > K/2 \end{cases} \quad (31)$$

$$A = \frac{r}{1-r} [K - 1 - r^{K/2} - \frac{2r}{1-r}(1 - r^{K/2-1})] \quad (32)$$

$$r = 1 - \frac{4}{K} \quad (33)$$

Another approximation to equation (29) which is reasonably easy to implement in hardware is $$\dot{\theta}_c(nK) = \dot{\theta}_c[(n-1)K] + \frac{1}{B} \sum_{k=1}^{\frac{K}{2}-1} (1 - r_2^{K/2} r_1^{K/2-k}) D\theta(nK+k) + \frac{1}{B} \sum_{k=K/2}^{K-1} (1 - r_2^{K-k}) D\theta(nK+k) \quad (34)$$

where $$B = K - 1 - \frac{r_1}{r_1 - 1} r_2^{K/2}(r_1^{K/2-1} - 1) - \frac{r_2}{r_2 - 1}(r_2^{K/2} - 1) \quad (35)$$

$$r_2 = 1 - \frac{4}{K} \quad (36)$$

$$r_1 = 1/r_2 \quad (37)$$

If the $\theta(m)$ are normally distributed, the estimate of $\dot{\theta}_c$ given by equation (29) will have the smallest possible standard deviation. The H's based on the $\dot{\theta}_c$'s given by equations (30) and (34), however, will have standard deviations only a few percent higher.

Equations (30) and (34) can be written in an iterative form which is convenient for implementation. Define $X^*(m)$ and $X^{**}(m)$ by the equations $$X^*(nK+k) \triangleq \begin{cases} 0 & ; k < K/2 \\ r[X^*(nK+k-1) + X(nK+k)] & ; k \geq K/2 \end{cases} \quad (38)$$

$$X^{}(nK+k) \triangleq \begin{cases} 0 & ; k < K/2 \\ X^{}(nK+k-1) + X^*(nK+k) & ; k \geq K/2 \end{cases} \quad (39)$$

Since $$X^{**}(nK+K-1) = \sum_{k=K/2}^{K-1} r \frac{1 - r^{K-k}}{1 - r} X(nK+k) \quad (40)$$

Equation (30) can be rewritten as $$\dot{\theta}_c(nK) = \dot{\theta}_c[(n-1)K] + 1/A \, X^{**}(nK+K-1) \quad (41)$$

A similar form for equation (34) can be derived. Define $D\theta^*$ and $D\theta^{**}$ by the equations $$D\theta^*(nK+k) = \begin{cases} 0 & ; k = 0 \\ D\theta^*(nK+k-1) + D\theta(nK+k) & ; k \neq 0 \end{cases} \quad (42)$$

-continued $$D\theta^{}(nK + k) = \begin{cases} 0 & ; k = 0 \\ r_1[D\theta^{}(nK + k - 1) + D\theta(nK + k)]; 1 \leq k \leq \frac{K}{2} - 1 \\ r_2[D\theta^{**}(nK + k - 1) + D\theta(nK + k)]; \frac{K}{2} \leq k \leq K - 1 \end{cases} \quad (43)$$

Since $$D\theta^*(nK + K - 1) = \sum_{k=1}^{K-1} D\theta(nk + k) \quad (44)$$

$$D\theta^{**}(nK + K - 1) = \sum_{k=1}^{\frac{K}{2}-1} r_2^{K/2} r_1^{K/2-k} D\theta(nk + k) + \sum_{k=1}^{K-1} r_2^{K-k} D\theta(nk + k) \quad (45)$$

Equation (34) can be rewritten as $$\dot{\theta}_c(nK) = \dot{\theta}_c[(n-1)K] + 1/B[D\theta^*(nK+K-1) - D\theta^{**}(nK+K-1)] \quad (46)$$

Equations (24) and (25) can be rewritten in a similar fashion. Define $\delta\theta^*$ by the equation $$\delta\theta^*(nK + k) = \begin{cases} \begin{Bmatrix} \delta\theta^*(nK) & ; \text{data absent} \\ [\delta\theta^*(nK)]_{\pm ZT}; \text{data present} \end{Bmatrix} k = 0 \\ \begin{Bmatrix} \delta\theta^*(nK + k - 1) + \delta\theta(nK + k) & ; \text{data absent} \\ \delta\theta^*(nK + k - 1) + \delta\theta(nK + k)_{\pm ZT}; \text{data present} \end{Bmatrix} k \neq 0 \end{cases} \quad (47)$$

Since $$\delta\theta^*(nK + K - 1) = \begin{cases} \sum_{k=0}^{K-1} \delta\theta(nK + k) & ; \text{data absent} \\ \sum_{k=0}^{K-1} [\delta\theta(nK + k)]_{\pm ZT}; \text{data present} \end{cases} \quad (48)$$

Equations (24) and (25) can be rewritten as $$H(nK) = H[(n-1)K] + K\dot{\theta}_c[(n-1)K] + 1/K\delta\theta^*[(n-1)K + K - 1] \quad (49)$$

$$\theta_r(nK) = H[(n-1)K] + 1/K\delta\theta^*[(n-1)K + K - 1] \quad (50)$$

And finally it is convenient to define a quantity $\dot{\theta}_c$ where $$\dot{\theta}_c^*(nK + k) = \begin{cases} 0 & ; k = 0 \\ \dot{\theta}_c^*(nK + k - 1) + \dot{\theta}_c[(n-1)K] ; k \neq 0 \end{cases} \quad (51)$$

Since $$\dot{\theta}_c^*(nK+k) = k\dot{\theta}[(n-1)K] \quad (52)$$

Equations (15) and (17) can be rewritten in the form $$H(nK+k) = H(nK) + \dot{\theta}_c^*(nK+k) \quad (53)$$

$$\theta_r(nK+k) = \theta_r(nK) + \dot{\theta}_c^*(nK+k) \quad (54)$$

The phase modulation which, in effect, is given by C(m) is removed by subtracting the phase reference for the previous group $\theta_r$ from the measured phase data for the previous group and transforming the results to the $-2ZT$ to $+2ZT$ range.

$$C(nK+k) = \{\theta[(n-1)K+k] - \theta_r(nK+k)\}_{\pm 2ZT} \quad (55)$$

Note again that the keying interval in question is actually the $(n-1)K+k$)th interval. The bit identification function can be accomplished more readily if C is transformed into C' by the equation $$C'(nK+k) = ZT - |C(nK+k)| \quad (56)$$

A "hard" decision can be made as to the identity of the k'th bit of the n'th group by noting the sign of C'(nK+k). If the sign is positive, the data bit is a "0". If the sign is negative, the bit is a "1". If error control is used, the C'(nK+k) becomes the input to the error corrector.

One is now in a position to expand the definition of $D\theta$ given by equation (28) to cover the situation when data is being transmitted. Let $$S(nK + k) = \begin{cases} SGN[C(nK + k) - C(nK + k - 1)]; SGN[C'(nK + k) \cdot (C'(nK + k - 1)] = -1 \\ 0 & ; SGN[C'(nK + k) \cdot (C'(nK + k - 1)] = 1 \end{cases} \quad (57)$$

Then $$D\theta(nK + k) = \begin{cases} \delta\theta(nK + k) - \delta\theta(nK + k - 1); \text{data absent} \\ C(nK + k) - C(nK + k - 1) - 2ZTS(nK + k); \text{data present} \end{cases} \quad (58)$$

The use of C rather than $\delta\theta$ when data is present is advisable since C is derived from a more accurate phase reference. ($\delta\theta$ uses an estimate of unmodulated phase which is obtained from the prior group of keying intervals and then extrapolated to the group of keying intervals to be decoded, while C uses an estimate of unmodulated phase which is obtained directly from the group of keying intervals being decoded.) The term involving S in the "data present" expression for $D\theta$ removes the 2ZT phase changes that are a consequence of data transmission. The phase changes introduced by the transmission of data are completely removed only if the sign of C' accurately identifies each transmitted bit.

COMPUTATIONAL PROCEDURE WITHIN THE MICROPROCESSOR

A systematic procedure for computing the demodulation function C' which produces the output of the demodulator is given in Tables A and B which appear at the end of the Specification and the flow chart in FIG. 2. The procedure outlined requires a microprocessor that can perform fixed-point binary arithmetic. The only multiplications and divisions that are required involve multiplication or division by fixed constants which are implemented by a short sequence of additions, subtractions, and right and left shifts. The relationships of the equations shown in the tables with respect to the equations derived above also are indicated in the paragraphs that follow.

At the beginning of the receipt of a transmission "burst", the microprocessor begins operation as indicated by the flow chart in FIG. 2. First the values in the computer for n and k are set equal to zero, the flag is reset (that is, it is placed in the "0" state), and the values for E and $\alpha$ indicated in column "A" of FIG. 2A are loaded into the microprocessor. If there has been no prior burst, or if the error rate during the prior burst has been excessive, the values for $QK\dot{\theta}_0$ has previously been set equal to zero, and the microprocessor follows the steps indicated on the right hand side of the flow chart. If a non-zero value of $QK\dot{\theta}_0$ was retained from a previous burst, then the microprocessor follows the left-hand branch of the flow chart. In either case, the microprocessor executes, in order, the equations listed in Table A. During the first keying interval (k=0) of the n'th group of keying intervals the left-hand terms of the equations in Table A are computed in the order shown using measured phase data available at the beginning of the first keying interval.

The "Receiver Sync" referred to in FIG. 2 is an externally supplied signal which indicates whether the receiver is synchronized. Reacquisition never takes place except at the beginning of a new burst.

Equation A-1

If data is not being transmitted and if equation (13) fails (because of an unusually large noise perturbation) or if data is being transmitted and if, for one or more values of k, the following inequality holds, $$SGN\{C'[(n-1)K+k]\cdot C'[(n-1)K+k-1]\} \neq D[(n-1)K+k]\cdot D[(n-1)K+k-1], \quad (59)$$

then an abnormally large value for W (see definition of W at bottom of Table A) will usually be obtained which is an indication that the computed value of W may be invalid and therefore that it should not be used to correct $\dot{\theta}_c$. Equations A-1 and A-2 give effect to the preceding statement. Quantity $\epsilon$ denotes the occurrence or non-occurrence of reasonably-sized W values. The threshold E of reasonableness should be two or three times the anticipated standard deviation of W. Because E has been set equal to 0 when column "A" was loaded, the value for $\epsilon$ for the first execution of equation A-1 is also zero.

Equation A-2

This equation is equivalent to equation (41) except that $\dot{\theta}_c$ and W have been scaled by a factor QK (the scaling of W is accomplished by scaling D$\theta$) and the W correction term is divided by a factor N where N is a number equal to or greater than one. The initial value of $QK\dot{\theta}_c(J)$ is set equal to zero if the bit error rate becomes excessive. The use of values of N greater than one may be desirable to further reduce the statistical fluctuation in $\dot{\theta}_c$. The quantity $\epsilon$ causes the correction to $\dot{\theta}_c$ to be ignored if it is implausibly large. The scale factor Q should be at least equal to the largest value of N used.

Equation A-3

This equation is equivalent to equation (5) scaled by the factor K.

Equation A-4

This equation is equivalent to equation (50). The value of $\delta\theta^*$ (J) for J=$-1$, can have any value.

Equation A-5

This equation is equivalent to the difference between equations (49) and (50). The value of $QK\dot{\theta}_c(J)$ for J=$-K$ can have any value.

Equation A-6

This equation is equivalent to equation (14) except for the factor $\alpha$ which is equal to either zero or one and is controlled externally. By making $\alpha$ equal to one, the phase references can be frozen. $\theta(nK)$ is the phase of the received signal as measured by the apparatus depicted in FIG. 1 and calculated in accord with equation (3).

Equation A-7

This equation is equivalent to equation (55). $\theta(-K)$ may have any value.

Equation A-8

The equation is equivalent to equation (56).

Equation A-9

The equation is equivalent to equation (47).

Equation A-10a

This equation is equivalent to equation (38).

Equation A-11a

This equation is equivalent to equation (39).

Equation A-10b

The equation is equivalent to equation (42).

Equation A-11b

This equation is equivalent to equation (43).

As indicated by the flow diagram in FIG. 2, after the equations in Table A have been executed, the microprocessor then executes the equations in Table B for K$-1$ times. The left-hand terms of the equations shown in Table B are computed in the order shown during the k'th keying interval (k$\neq$0) of the n'th group of keying intervals using measured phase data available at the beginning of the k'th keying interval.

Equation B-1

This equation is equivalent to equation (51) scaled by the factor K.

Equation B-2

This equation is equivalent to equation (54).

Equation B-3

This equation is equivalent to equation (53).

Equation B-4

This equation is equivalent to equation (14) except for the factor $\alpha$ which is equal to either zero or one and is controlled externally. By making $\alpha$ equal to one, the phase reference can be frozen.

Equation B-5

This equation is equivalent to equation (55). $\theta(J)$ for $j \leq 0$ can have any value. The initial value for $\theta(J)$ will not affect the operation of the demodulator since this equation is used to demodulate the data, and data normally is not being received during the first set of keying intervals.

Equation B-6

This equation is equivalent to equation (56). As indicated earlier, the sign of C' as represented by a 0 or 1 for − and + respectively constitutes the demodulated data and is output from the microprocessor as the output of the system.

Equation B-7

This equation is equivalent to equation (47).

Equation B-8

This equation is equivalent to equation (57).

Equation B-9

This equation is equivalent to equation (58) scaled by the factor Q.

Equation B-10a

This equation is equivalent to equation (31).

Equation B-11a

This equation is equivalent to equation (38). The value of r is given by equation (30) in terms of K. If K is chosen to be some power of 2 (i.e., $2^p$ where p is an integer), then $$rM = M - 2^{2-p}M \tag{60}$$

and the multiplication of M by r is equivalent to a right shift of (2−p) places followed by a subtraction.

Equation B-12a

This equation is equivalent to equation (39).

Equation B-11b

This equation is equivalent to equation (42).

Equation B-12b

This equation is equivalent to equation (43). Values of $r_1$ and $r_2$ which are more convenient for implementation are given by the equations $$r_2 = 1(4/K) \tag{61}$$

$$r_1 = 1 + (4/K) \tag{62}$$

These equations are to be compared with equations (33) and (34) which were recommended earlier. While values for $r_1$ and $r_2$ given by equations (33) and (34) will result in $\theta_c$ estimates with standard deviations only a few percent higher than the lowest possible, those given by equations (61) and (62) result in $\hat{\theta}_c$ estimates with standard deviations about 15% higher.

Multiplication by the $r_1$ or $r_2$ values given by equations (61) and (62) are equivalent to a right shift followed by either a subtraction or an addition (see discussion in connection with equation B-11a). At the termination of the demodulation of the transmission burst, the microprocessor is reset to the beginning of the flow chart.

The results of a computer simulation of the system of this invention are listed in Table C which appears at the end of the Specification.

TABLE A (k = 0) Equations $$\epsilon[(n-1)K] = \begin{cases} 0; & |W[(n-1)K + K - 1]| \geq E \\ 1; & |W[(n-1)K + K - 1]| < E \end{cases} \tag{A-1}$$

$$\{QK\theta_c[(n-1)K]\} = \{QK\theta_c[(n-2)K]\} + \frac{\epsilon[(n-1)K]K}{AN} W[(n-1)K + K - 1] \tag{A-2}$$

$$\{K\theta_c^*(nK)\} = 0 \tag{A-3}$$

$$\theta_r(nK) = H[(n-1)K] + \frac{1}{K} \delta\theta^*[(n-1)K + K - 1] \tag{A-4}$$

$$H(nK) = \theta_r(nK) + \frac{1}{Q} \{QK\theta_c[(n-1)K]\} \tag{A-5}$$

$$\delta\theta(nK) = \alpha[\theta(nK) - H(nK)]_{\pm 2ZT} \tag{A-6}$$

$$C(nK) = \{\theta[(n-1)K] - \theta_r(nK)\}_{\pm 2ZT} \tag{A-7}$$

$$C'(nK) = ZT - |C(nK)| \tag{A-8}$$

(A-9)

$$\delta\theta^*(nK) = \begin{cases} \delta\theta(nK); & \text{; data absent} \\ [\delta\theta(nK)]_{\pm ZT}; & \text{data present} \end{cases}$$

$$\left. \begin{array}{l} X^*(nK) = 0 \\ X^{**}(nK) = 0 \end{array} \right\} \text{Alternative A} \quad \begin{array}{l} \text{(A-10a)} \\ \text{(A-11a)} \end{array}$$

$$\left. \begin{array}{l} D\theta^*(nK) = 0 \\ D\theta^{**}(nK) = 0 \end{array} \right\} \text{Alternative B} \quad \begin{array}{l} \text{(A-10b)} \\ \text{(A-11b)} \end{array}$$

Note:
K = number of keying intervals (K = 32 in the best mode)

$$W[(n-1)K + K - 1] = \begin{cases} X^{**}[(n-1)K + K - 1] & ; \text{Alternative A} \\ D\theta^*[(n-1)K + K - 1] - D\theta^{**}[(n-1)K + K - 1] & ; \text{Alternative B} \end{cases}$$

TABLE B

(k ≠ 0) Equations

$$\{K\theta_c{}^*(nK + k)\} = \{K\theta_c{}^*(nK + k - 1)\} + \frac{1}{Q}\{QK\theta_c[(n-1)K]\} \quad \text{(B-1)}$$

$$\theta_r(nK + k) = \theta_r(nK) + \frac{1}{K}\{K\theta_c{}^*(nK + k)\} \quad \text{(B-2)}$$

$$H(nK + k) = H(nK) + \frac{1}{K}\{K\theta_c{}^*(nK + k)\} \quad \text{(B-3)}$$

$$\delta\theta(nK + k) = a[\theta(nK + k) - H(nK + k)]_{\pm 2ZT} \quad \text{(B-4)}$$

$$C(nK + k) = \{\theta[(n-1)K + k] - \theta_r(nK + k)\}_{\pm 2ZT} \quad \text{(B-5)}$$

$$C'(nK + k) = ZT - |C(nK + k)| \quad \text{(B-6)}$$

$$\delta\theta^*(nK + k) = \begin{cases} \delta\theta^*(nK + k - 1) + \delta\theta(nK + k) & \text{; data absent} \\ \delta\theta^*(nK + k - 1) + [\delta\theta(nK + k)]_{\pm ZT} & \text{; data present} \end{cases} \quad \text{(B-7)}$$

$$S(NK + k) = \begin{cases} SGN[C(nK + k) - C(nK + k - 1)]; & SGN[C'(nK + k) \cdot C'(nK + k - 1)] = -1 \\ 0 & ; SGN[C'(nK + k) \cdot C'(nK + k - 1)] = 1 \end{cases} \quad \text{(B-8)}$$

$$D\theta(nK + k) = \begin{cases} Q[\delta\theta(nK + k) - \delta\theta(nK + k - 1)]_{\pm 2ZT} & \text{; data absent} \\ Q[C(nK + k) - C(nK + k - 1) - 2ZT \, S(nK + k)] & \text{; data present} \end{cases} \quad \text{(B-9)}$$

$$X(nK + k) = \begin{cases} 0 & ; k < K/2 \\ D\theta(nK + k) & ; k = K/2 \\ [D\theta(nK + k) + D\theta(nK + K - k)]; & k > K/2 \end{cases} \quad \begin{matrix}\text{(B-10a)} \\ \\ \text{(B-11a)}\end{matrix}$$

$$X^*(nK + k) = \begin{cases} 0 & ; k < K/2 \\ r[X^*(nK + k - 1) + X(nK + k)]; & k \geq K/2 \end{cases} \quad \text{ALTERNATIVE A} \quad \text{(B-12a)}$$

$$X^{}(nK + k) = \begin{cases} 0 & ; k < K/2 \\ X^{}(nK + k - 1) + X^*(nK + k); & k \geq K/2 \end{cases}$$

$$D\theta^*(nK + k) = D\theta^*(nK + k - 1) + D\theta(nK + k) \quad \text{(B-11b)}$$

$$D\theta^{}(nK + k) = \begin{cases} r_1[D\theta^{}(nK + k - 1) + D\theta(nK + k)]; & 1 \leq k \leq K/2 - 1 \\ r_2[D\theta^{**}(nK + k - 1) + D\theta(nK + k)]; & K/2 \leq k \leq -1 \end{cases} \quad \text{ALTERNATIVE B} \quad \text{(B-12b)}$$

TABLE C

Simulation Results for $E_b/N_o = 0$ dB
(Theoretical Value for Bit Error Probability = .079)

| | |
|---|---|
| Total No. of Bursts | 500(100%) |
| No. of Bursts for which Bit Error Probability was less than: | |
| 0.2 | 453( 91%) |
| 0.1 | 433( 87%) |

I claim:

1. A process for demodulating a received, coherent phase-shift keyed signal comprising:
    (a) generating a local oscillator signal,
    (b) measuring the phase of the received signal relative to the local oscillator signal for each keying interval in successive preselected sets of keying intervals,
    (c) calculating an estimate of the unmodulated phase and rate of change of the unmodulated phase of the received signal relative to the local oscillator signal during each preselected set of keying intervals,
    (d) generating a phase reference for each preselected set of keying intervals from the estimate for each preselected set of keying intervals of the unmodulated phase and rate of change of unmodulated phase of the received signal relative to the local oscillator signal,
    (e) demodulating the received signal by comparing the phase of the received signal to the phase reference, and
    (f) outputting the demodulated received signal.

2. The process described in claim 1 wherein the step of calculating an estimate of the unmodulated phase and the rate of change of the unmodulated phase of the received signal relative to the local oscillator signal and the step of generating a phase reference comprises:
    (a) calculating a first estimate of the unmodulated phase and the rate of change of the unmodulated phase of the received signal relative to the local oscillator signal for a first preselected set of keying intervals,
    (b) extrapolating the first estimate for the first set of keying intervals to obtain the first phase reference for the second successive set of keying intervals,
    (c) calculating a second estimate of the unmodulated phase and the rate of change of the unmodulated phase of the received signal, relative to the local oscillator signal, for the second preselected set of keying intervals by measuring the phase of the received signal during the second preselected set of keying intervals, relative to the first phase reference,
    (d) generating a second phase reference for the second preselected set of keying intervals, from the second estimate,
    (e) extrapolating the second estimate to obtain a first phase reference for a third successive set of keying intervals,
    (f) repeating steps (c), (d), and (e) for each subsequent preselected set of keying intervals, and
  wherein the step of demodulating the received signal comprises:
    (a) comparing the phase of received signal, relative to the second phase reference during each keying interval within the second preselected set of keying intervals to obtain the demodulated signal, and
    (b) repeating step (a) for each subsequent preselected set of keying intervals.

3. A demodulator for demodulating a received, coherent phase-shift-keyed signal comprising:
   (a) means for generating a local oscillator signal,
   (b) means for measuring the phase of the received signal, relative to the local oscillator signal, for each keying interval in successive preselected sets of keying intervals,
   (c) means for calculating an estimate of the unmodulated phase and the rate of change of the unmodulated phase of the received signal, relative to the local oscillator signal, during each set of keying intervals,
   (d) means for generating a phase reference for each preselected set of keying intervals from the estimate of the unmodulated phase and the rate of change of the unmodulated phase of the received signal relative to the local oscillator signal,
   (e) means for demodulating the received signal by comparing the phase of the received signal to the phase reference and
   (f) means for outputting the demodulated received signal.

4. The device described in claim 3 wherein the means for calculating an estimate of the unmodulated phase and the rate of change of the unmodulated phase of the received signal relative to the local oscillator signal and the means for generating a phase reference comprise:
   (a) means for calculating a first estimate of the unmodulated phase and the rate of change of the unmodulated phase of the received signal relative to the local oscillator signal for a first preselected set of keying intervals,
   (b) means for extrapolating the first estimate for the first set of keying intervals to obtain a first phase reference for the second successive set of keying intervals,
   (c) means for calculating a second estimate of the unmodulated phase and the rate of change of the unmodulated phase of the received signal, relative to the local oscillator signal for the second set of keying intervals by measuring the phase of the received signal during the second preselected set of keying intervals, relative to the first phase reference,
   (d) means for generating a second phase reference for the second preselected set of keying intervals from the second estimate, and
   (e) means for extrapolating the second estimate to obtain a first phase reference for a third successive set of keying intervals, and wherein the means for demodulating the received signal comprises means for comparing the phase of received signal, relative to the second phase reference, during each keying interval within the second preselected number of keying intervals, and outputting the demodulated signal.

* * * * *